March 10, 1964    J. H. STRATHMAN    3,124,746
WAVEFORM SAMPLING CIRCUIT
Filed June 14, 1960
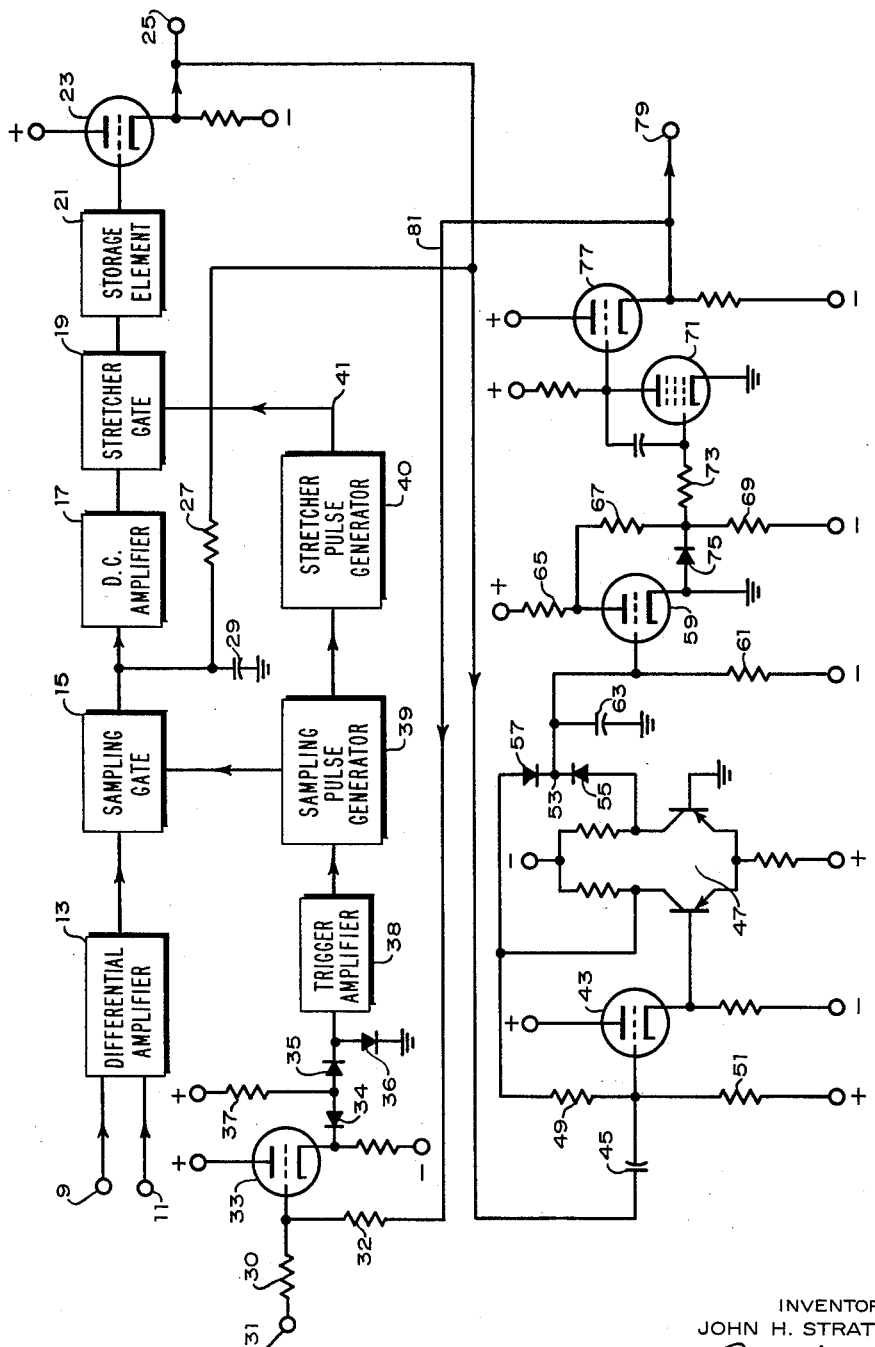
INVENTOR
JOHN H. STRATHMAN
BY
ATTORNEY United States Patent Office 3,124,746
Patented Mar. 10, 1964

3,124,746
WAVEFORM SAMPLING CIRCUIT
John H. Strathman, Menlo Park, Calif., assignor to Hewlett-Packard Company, Palo Alto, Calif., a corporation of California
Filed June 14, 1960, Ser. No. 35,988
10 Claims. (Cl. 324—77)

This invention relates to sampling circuits.

Sampling circuits are used to analyse a recurring waveform, generally for the purpose of producing a pictorial representation of the waveform. A sample measurement is made at a selected point being moved by small time increments along the waveform at each successive recurrence. Sampling techniques, as used in sampling oscilloscopes, are described in U.S. Patents 2,280,524 and 2,280,531 issued April 21, 1942, to S. Hansen and D. E. Norgaard respectively, and in British Patent 692,615 published June 10, 1953.

The rate of change of a waveform with respect to time is a variable quantity, unless, of course, the waveform is a straight line. It is desirable to have a greater number of samples in regions where the waveform is changing rapidly than where the waveform is changing slowly. This provides greater accuracy of reproduction.

Further, when a device which is used to reproduce the waveform has substantial inertia, as is the case of the writing pen of a graphic recorder, it is desirable to reduce the reproduction rate whenever the waveform shows a fast rate of change. For example, if the waveform being reproduced is a pulse train, it is necessary to reduce the horizontal deflection rate of the pen during the time when the pen is subjected to a fast rate of change in the vertical direction. Yet, in order to obtain a good speed of reproduction, it is desirable to have a high horizontal deflection rate when the pen is subjected to a relatively slow rate of change in the vertical direction. In this manner, compensation for the inertial movement of the pen is provided without undue sacrifice of reproduction speed.

It is therefore an object of the present invention to provide faster speed and greater accuracy of reproduction in sampling devices by obtaining many samples of the waveform under examination in regions of rapid change.

It is another object of the present invention to provide a sampling circuit which produces a number of samples in a region of the recurring waveform that is dependent upon the rate of change of the waveform in the said region.

It is a further object of the present invention to provide a circuit which produces a first output voltage proportional to the amplitude of the waveform under examination at successive sampling points, and which produces a second voltage having a slope which is inversely proportional to the rate of change of the amplitude of successive samples.

Other and incidental objects of the present invention will be apparent from a reading of this specification and an inspection of the accompanying drawing which shows a schematic diagram of an embodiment of the present invention.

Although this invention is generally applicable to other signal analyzing equipment, it will be described in connection with an oscilloscope in which it is desired to provide output voltages suitable for driving a graphic recorder.

Referring to the drawing, input terminals 9 and 11 are connected to differential amplifier 13. The output of differential amplifier 13 is connected to a D.-C. amplifier 17 through a sampling gate 15. The D.-C. amplifier 17 is connected through the stretcher gate 19 and storage element 21 to the cathode follower 23, the output of which is connected to output terminal 25. A feedback path to the output of sampling gate 15 is provided from the output terminal 25 by resistor 27 and capacitor 29. Resistor 30 from input terminal 31 and resistor 32 from output terminal 79 are connected to the grid of cathode follower 33. Diodes 34, 35 and tunnel diode 36 are serially connected between the output of 33 and ground. The common terminal of diodes 34 and 35 is connected to a positive potential through resistor 37. The input of trigger amplifier 38 is connected to the common terminal of diode 35 and tunnel diode 36. The trigger amplifier 38 is connected to a sampling pulse generator 39, the outputs of which are connected to sampling gate 15 and to stretcher pulse generator 40. The stretcher gate 19 is connected to the stretcher pulse generator 40 through line 41. The output terminal 25 is connected to the input grid of cathode follower 43 through capacitor 45. A differential amplifier 47, with one input terminal referenced to ground, is connected to the output of cathode follower 43. Resistors 49 and 51 provide a feedback path from one output of the differential amplifier to the input grid of cathode follower 43. The two output terminals of differential amplifier 47 are connected to a common node 53 through diodes 55 and 57. The input grid of amplifier 59, resistor 61, and capacitor 63 are connected to the node 53. Amplifier stage 59 comprises a load resistor 65 and a resistance divider comprising resistors 67 and 69. Miller integrator stage 71 is connected to the common point of resistors 67 and 69 through resistors 73. Diode 75 is connected between the common point of resistors 67 and 69 and ground. The output of the Miller integrator 71 is connected to the output terminal 79 through cathode follower 77. Resistor 32 of the comparator circuit is connected to output terminal 79 through line 81.

The operation of the circuit is as follows: a balanced signal from the vertical amplifier of a cathode ray oscilloscope is applied to input terminals 9 and 11 of differential amplifier 13. The signal which appears at the output terminal of differential amplifier 13, is sampled by sampling gate 15 in response to sampling pulses produced by generator 39, which samples are applied to the input terminal of direct current amplifier 17. A stretcher gate 19, actuated by the stretcher pulse generator 40, is provided to apply the output signal of direct current amplifier 17 to the storage element 21. The signal which appears at the output of the storage element 21 is applied to output terminal 25 through cathode follower 23.

Capacitor 29 is provided at the output of the sampling gate 15 to store the amplitude of successive samples during the time that stretcher gate 19 is operating. During the time when sampling gate 15 is open (i.e. not conducting), capacitor 29 will discharge through leakage paths in the non-conducting gate 15. In order to maintain the voltage on capacitor 29 at a substantially constant value during the time when the sampling gate is not conducting, resistor 27 is provided to apply the voltage appearing at output terminal 25 to capacitor 29. In this manner, the voltage that appears across capacitor 29, during the time between successive sample pulses, remains substantially constant as the value of the previous pulse.

The rate of change of the voltage at the output of storage element 21, which voltage represents the vertical coordinate of the waveform under examination at the sample point, is coupled to the input of cathode follower 43 by coupling capacitor 45. The differential amplifier 47, which is connected to the output of cathode follower 43, and the diodes 55 and 57 serve to produce an output signal which is proportional to the absolute value of the rate of change of the voltage that appears at output terminal 25. The term "absolute value" is used to denote the magnitude only of a quantity which has magnitude and polarity. Negative feedback is provided between a suitable output terminal of the differential amplifier 47 and the input grid of cathode follower 43, in order to reset the voltage that appears at node 53 to a predetermined value whenever the slope or rate of change of the voltage that appears at output terminal 25 is reduced to zero. The voltage that appears at node 53 is filtered by capacitor 63 and is applied to the input terminal of amplifier 59. Amplifier 59, through a divider comprising resistors 67 and 69, serves to control the charging current to the integrating capacitor of the Miller integrator stage 71 by controlling the current that flows in resistor 73. The integrator stage produces an output ramp voltage with a slope that is related to the current in resistor 73. Diode 75 is provided to prevent the controlling voltage from going negative and thereby prevents the integrator from performing negative integration.

Thus, the slope of voltage appearing at the output of the Miller integrator stage 71 is controlled by the absolute value of the rate of change of the output voltage appearing at terminal 25. The output ramp voltage of the Miller integrator 71 is coupled to the output terminal 79 and to resistor 32, through cathode follower 77. A sweep voltage, such as from the main sweep of a cathode ray oscilloscope, is applied to input terminal 31. A voltage comparator comprising resistors 30, 32 and 37, cathode follower 33, diodes 34 and 35, and tunnel diode 36 is used to detect the instant when a predetermined relationship exists between the two applied voltages.

The operation of the voltage comparator is as follows: a sweep voltage having a negative starting voltage and a positive slope is applied to the input grid of cathode follower 33 through resistor 30. The slow ramp voltage that appears at output terminal 79 is applied to the input grid through resistor 32. As long as the voltage that appears on the grid of cathode follower 33 is negative, i.e. the sum of the applied voltages is negative, a current will flow through the forward biased diode 34, and substantially no current will flow through diode 35 and tunnel diode 36. At the instant when the sum of the voltages applied to cathode follower 33 is sufficient to render diode 34 non-conductive, the current that initially flowed through diode 34 will switch and flow through diode 35. The current that flows through diode 35, causes the tunnel diode 36 to switch to a state of relatively higher forward conduction voltage, thereby producing an output pulse which is subsequently applied to trigger amplifier 38.

Other suitable voltage comparators might be used to provide an output signal when the applied voltages bear a predetermined relationship to each other. The comparator circuit, as previously described, was developed to make use of the fast switching characteristics of the tunnel diode and to provide an output signal when the sum of the applied voltages is substantially zero.

For a constant voltage waveform under examination the voltage appearing at output terminal 25 is substantially constant, therefore the rate of change of the output voltage with time is substantially zero. For a zero rate of change of voltage with time, the Miller integrator stage 71 produces a ramp voltage having a maximum slope. The ramp voltage appearing at output terminal 79, then, is compared with the relatively faster sweep voltage from such source as the main sweep of an oscilloscope by the comparator circuit. For each recurrence of the waveform under examination, the sweep voltage appearing at input terminal 31 is compared with the slowly decaying ramp voltage appearing at terminal 79, and each time the two voltages add up to a predetermined value, a trigger pulse is initiated which is applied to the input of trigger amplifier 38. These trigger pulses, delayed an incremental amount of time for each recurrence of the waveform, relative to the start of the sweep voltage, actuate the sampling pulse generator 39 which controls both the sampling gate 15 and the stretcher pulse generator 40 which controls stretcher gate 19. The voltage that appears on output terminal 25, then, represents the vertical coordinate of the recurring waveform at a specific time, and the voltage that appears on output terminal 79 represents the horizontal coordinate of the recurring waveform at the same instant of time. A readout device, such as a graphic recorder or cathode ray display tube, when suitably connected to terminals 25 and 79, will produce a pictorial representation of the recurring waveform.

For a recurring waveform having a portion of substantially constant amplitude as displayed, for example, on a graphic recorder, the variation in vertical displacement of the writing pen, as determined by the voltage appearing at output terminal 25, will be reduced to a minimum. And the variation in horizontal displacement, as determined by the output voltage appearing at 79, will be a maximum. For a waveform containing a region of abrupt change, such as a square wave, the vertical samples taken about the region of rapid change produces a maximum rate of change of sample amplitude with time. The large rate of change of voltage at output terminal 25 which is subsequently produced reduces the rate of change of horizontal coordinate voltage at output terminal 79 substantially to zero, until such time as the rate of change of vertical samples is reduced to a relatively smaller value. Reducing the rate of change of voltage at output terminal 79, enables the comparator to obtain many samples in the region of abrupt change, thereby providing more detailed reproduction of the waveform.

It can be seen, in accordance with the illustrative embodiment of the present invention, that the writing rate at which a graphic recorder reproduces the waveform under examination, is held substantially constant, and that the writing rate is maintained within the mechanical limitations of such a recorder.

I claim:

1. A circuit for obtaining two electrical signals each representative of one coordinate of a sample point on a waveform under examination, said circuit comprising a sampling gate having an input and an output, means to apply said waveform to the input of said sampling gate, a stretcher having an input and an output, said stretcher comprising another gate and a storage element, means connecting the output of said sampling gate and the input of said stretcher, means to generate a timing signal incrementally delayed relative to the start of said waveform at each successive recurrence thereof, means responsive to said timing signal to actuate both of said gates, means to obtain one of said electrical signals from the output of said stretcher, a ramp generator, means responsive to the rate of change of said electrical signal to vary the slope of said ramp, thereby obtaining the other of said electrical signals.

2. A circuit for obtaining two voltages each representative of one coordinate of a point on a waveform under examination, said circuit comprising a sampling gate having an input and an output, means to apply said waveform to the input of said sampling gate, a stretcher having an input and an output, said stretcher comprising another gate and a storage element, means connecting the output of said sampling gate and the input of said stretcher, means to obtain the first of said voltages from the output of said stretcher, a voltage comparator having one output and two input terminals, said voltage comparator producing an output signal when the voltages applied to the input terminals thereof bear a predetermined relationship to each other, means to apply a fast substantially linear ramp voltage to one input terminal of said voltage comparator, means responsive to said output signal to actuate both of said gates, a ramp voltage generator, means responsive to the rate of change of said first voltage to vary the slope of said ramp voltage, thereby obtaining the second of said voltages, and means to apply said second voltage to the other input terminal of said voltage comparator.

3. A circuit for obtaining two voltages each representative of a coordinate of a point on a waveform under examination, said circuit comprising a sampling gate having an input and an output, means to apply said waveform to the input of said sampling gate, a stretcher having an input and an output, said stretcher comprising another gate and a storage element, means connecting the output of said sampling gate and the input of said stretcher, means to obtain the first of said voltages from the output of said stretcher, means to apply said first voltage to the output of said sampling gate, a voltage comparator having one output and input terminals, said voltage comparator producing an output signal when the voltages applied to the input terminals thereof bear a predetermined relationship to each other, means to apply a fast substantially linear ramp voltage to one input terminal of said voltage comparator, means responsive to said output signal to actuate both of said gates, a differentiator having input and output terminals and being adapted to obtain the absolute value of the derivative of signals applied to the input terminal thereof, a ramp voltage generator, means including said differentiator to vary the slope of said ramp voltage, thereby obtaining the second of said voltages, and means to apply said second voltage to the other input terminal of said voltage comparator.

4. A circuit for driving a graphic recorder at a constant writing rate to reproduce a periodically recurring waveform, said circuit comprising a sampling gate having an input and an output, means to apply said waveform to the input of said sampling gate, a stretcher having an input and an output, said stretcher comprising another gate and a storage element, means connecting the output of said sampling gate and the input of said stretcher, first and second output terminals, means connecting the output of said stretcher and first of said output terminals, means connecting said first output terminal to the output of said sampling gate, a voltage comparator having one output and two input terminals, said voltage comparator producing an output signal when the voltages applied to the input terminals thereof bear a predetermined relationship to each other, means to apply a fast substantially linear ramp voltage to one input terminal of said voltage comparator, means connecting the other input terminal of said voltage comparator and second of said output terminals, means responsive to said output signal to actuate both of said gates, a differentiator responsive to the rate of change of voltage appearing on the first of said output terminals, a ramp voltage generator having input and output terminals, means including said differentiator to vary the slope of said ramp voltage connecting the said first output terminal and the input of said generator, and means connecting the output of said generator and the second of said output terminals.

5. A circuit for driving a graphic recorder at a constant writing rate to reproduce a periodically recurring waveform, said circuit comprising a sampling gate having an input and an output, means to apply said waveform to the input of said sampling gate, a stretcher having an input and an output, said stretcher comprising another gate and a storage element, means connecting the output of said sampling gate and the input of said stretcher, first and second output terminals, means connecting the output of said stretcher and first of said output terminals, means connecting said first output terminal to the output of said sampling gate, a voltage comparator having one output and two input terminals, said voltage comparator producing an output signal when the sum of the voltages applied to the input terminals thereof attains a predetermined value, means to apply a fast substantially linear ramp voltage to one input terminal of said voltage comparator, means connecting the other input terminal of said voltage comparator and second of said output terminals, means responsive to said output signal to actuate both of said gates, a differentiator responsive to the rate of change of voltage appearing on the first of said output terminals, a ramp voltage generator having input and output terminals, means including said differentiator to vary the slope of said ramp voltage connecting the said first output terminal and the input of said generator, and means connecting the output of said generator and the second of said output terminals.

6. A circuit according to claim 4 wherein the said means connecting the first output terminal to the output of said sampling gate comprises a resistor connected between the said first output terminal and the output of said sampling gate and a capacitor connected between the output of said sampling gate and ground.

7. A circuit according to claim 4 wherein the said differentiator comprises a first amplifier having input and output terminals, a differential amplifier having two input and two output terminals, a capacitor connected to differentiate the signal applied to the input terminal of said first amplifier, a reference potential, means connecting one input of said differential amplifier to said reference potential, means connecting the other input terminal of said differential amplifier and the output terminal of said first amplifier, means including two resistors providing a negative feedback path from a suitable output terminal of said differential amplifier to the input terminal of said first amplifier, means including two diodes connecting each of the output terminals of said differential amplifier to a common point, a second amplifier, filtering means connecting said common point and the input of said second amplifier, and means to apply a proportional amount of the output of said second amplifier to said ramp generator.

8. A circuit according to claim 5 wherein the said voltage comparator comprises an amplifier, first and second resistors connected between each of said input terminals and the input electrode of said amplifier, a source of direct current supply voltage of suitable polarity, a first diode and third resistor serially connected between said source of supply voltage and the output electrode of said amplifier, said first diode connected to be forward biased for a minimum signal appearing at the input electrode of said amplifier, a source of reference potential, a second diode and a tunnel diode serially connected between the common terminal of said first diode and said third resistor and the said source of reference potential, said second diode and said tunnel diode connected to be forward biased for a signal appearing at the output electrode of said amplifier that exceeds the said reference potential, and means connecting the common terminal of said second diode and said tunnel diode to the said output terminal.

9. A circuit for producing first and second electrical signals, each representative of one coordinate of a sample point on a waveform under examination, said circuit comprising a normally non-effective sampler connected to receive said waveform and adapted to become momentarily effective to produce a sample of said waveform in response to a control signal applied thereto, means connected to said sampler for applying control signals to said sampler at selected intervals during successive recurrences of said waveform, means connected to receive said samples and adapted to produce said first electrical signal, the amplitude of said first electrical signal being related to the amplitude of said samples and being variable as the amplitude of said samples varies, a generator for producing a ramp signal as said second electrical signal, and circuit means connected to said generator and connected to receive said first electrical signal, said circuit means being responsive to variations in the amplitude of said first electrical signal to alter the slope of said ramp signal.

10. A circuit for producing first and second electrical signals, each representative of one coordinate of a sample point on a waveform under examination, said circuit comprising a normally non-effective sampler connected to receive said waveform and adapted to become momentarily effective to produce a sample of said waveform in response to a control signal applied to said sampler, a comparator connected to said sampler for applying a control signal to the sampler when signals appearing at the inputs of said comparator bear a predetermined relationship to each other, means connected to receive samples of said waveform from said sampler and adapted to produce said first electrical signal having an amplitude related to the amplitude of said samples; means for applying a first ramp signal having a selected slope to an input of said comparator during successive recurrences of said waveform, a generator for producing said second electrical signal as a second ramp signal having less slope than said first ramp signal, circuit means connected to said generator and connected to receive said first electrical signal, said circuit means being responsive to variations in the amplitude of said first electrical signal to alter the slope of said second ramp signal, and means connected to another input of said comparator for applying said second electrical signal thereto.

References Cited in the file of this patent

UNITED STATES PATENTS

| | | |
|---|---|---|
| 2,507,525 | Hurvitz | May 16, 1950 |
| 2,576,339 | Gray | Nov. 27, 1951 |
| 2,632,036 | Hurvitz | Mar. 17, 1953 |
| 2,733,358 | Carapellotte | Jan. 31, 1956 |
| 2,962,625 | Berwin | Nov. 29, 1960 |

OTHER REFERENCES

Precise Measurement of Sawtooth Linearity, article in Electronics, November 1955, pages 204–216.